(12) United States Patent
Kotlarski

(10) Patent No.: US 6,687,948 B2
(45) Date of Patent: *Feb. 10, 2004

(54) WIPING DEVICE FOR WINDOWS OF MOTOR VEHICLES HAVING A WIPER ARM WHICH IS GUIDED ON THE VEHICLE AND DRIVEN IN A PENDULUM MANNER

(75) Inventor: Thomas Kotlarski, Buehlertal (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 44 days.

(21) Appl. No.: 09/341,999

(22) PCT Filed: Aug. 4, 1998

(86) PCT No.: PCT/DE98/02224

§ 371 (c)(1),
(2), (4) Date: Jul. 22, 1999

(87) PCT Pub. No.: WO99/33687

PCT Pub. Date: Jul. 8, 1999

(65) Prior Publication Data

US 2003/0097726 A1 May 29, 2003

(30) Foreign Application Priority Data

Dec. 24, 1997 (DE) .......................... 197 57 872

(51) Int. Cl.[7] .................................................. B60S 1/40
(52) U.S. Cl. .................................. 15/250.32; 15/250.43
(58) Field of Search .................. 15/250.32, 250.31, 15/250.361, 250.43, 250.44

(56) References Cited

U.S. PATENT DOCUMENTS 4,445,249 A * 5/1984 Harbison et al. ........ 15/250.32
4,598,438 A * 7/1986 Egner-Walter et al. .. 15/250.32
5,065,474 A * 11/1991 Charng .................... 15/250.32
5,070,573 A * 12/1991 Journee et al. .......... 15/250.32

FOREIGN PATENT DOCUMENTS

| DE | 2753252 | * | 6/1978 | .............. 15/250.32 |
|---|---|---|---|---|
| DE | 2715148 | * | 10/1978 | .............. 15/250.32 |
| DE | 2830508 | * | 1/1980 | .............. 15/250.32 |
| DE | 32 20 274 A1 | | 1/1983 | |
| EP | 459867 | * | 12/1991 | |
| EP | 791514 | * | 8/1997 | |
| FR | 1116801 | | 5/1956 | |
| FR | 2031697 | * | 11/1970 | |
| FR | 2254959 | * | 7/1975 | |

* cited by examiner

Primary Examiner—Gary K. Graham
(74) Attorney, Agent, or Firm—Michael J. Striker

(57) ABSTRACT

A device is proposed which is used to wipe windows of motor vehicles. The wiping device has an oscillatingly driven wiper arm (12), guided on the motor vehicle, on whose free end, remote from the oscillation axis (16), a wiper blade (22) which is elongated transversely to the oscillation direction, that can be placed against the window (24) is releasably hinged via a connection device (26) that has coupling parts of the wiper arm and of the wiper blade, and the hinge axis (32) extends substantially in the oscillation direction (double arrow 18). In such a wiping device, an especially low-wear hinge is obtained if the wiping device has at least one support shoulder (72 and 96), fixed to the wiper arm and pointing toward the oscillation axis (16), with which a check shoulder (74 and 102) fixed to the wiper blade and pointing away from the oscillation axis (16) is associated.

6 Claims, 2 Drawing Sheets

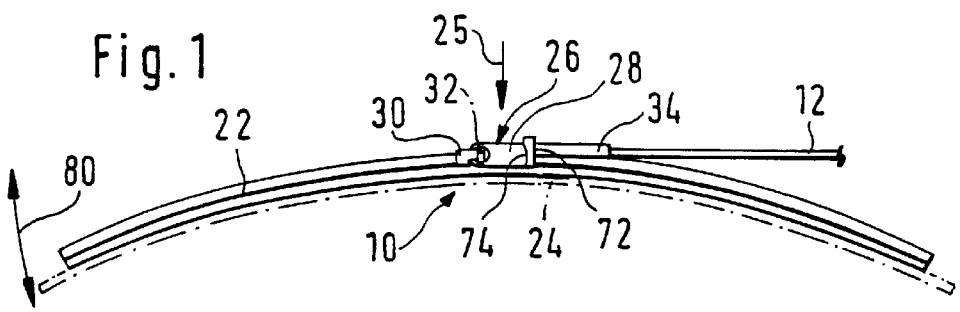
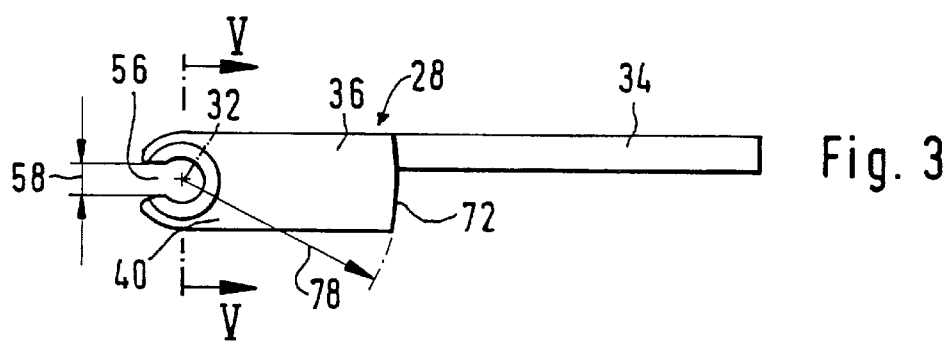
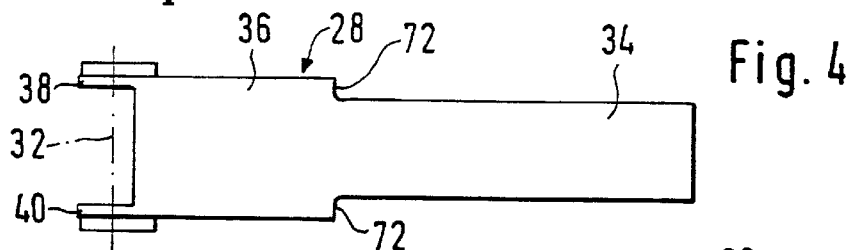
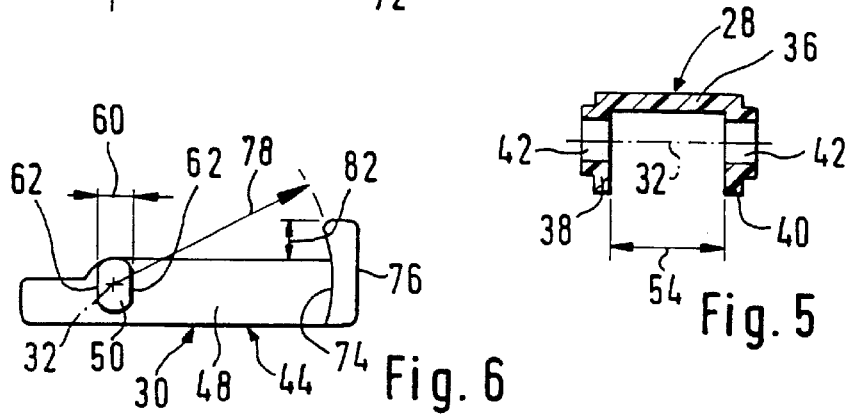
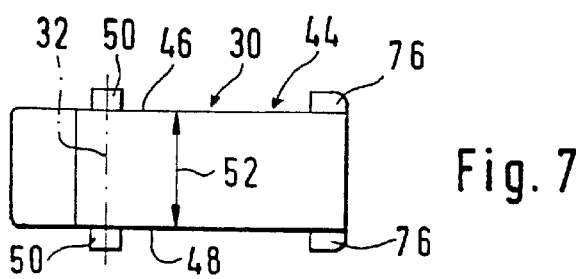

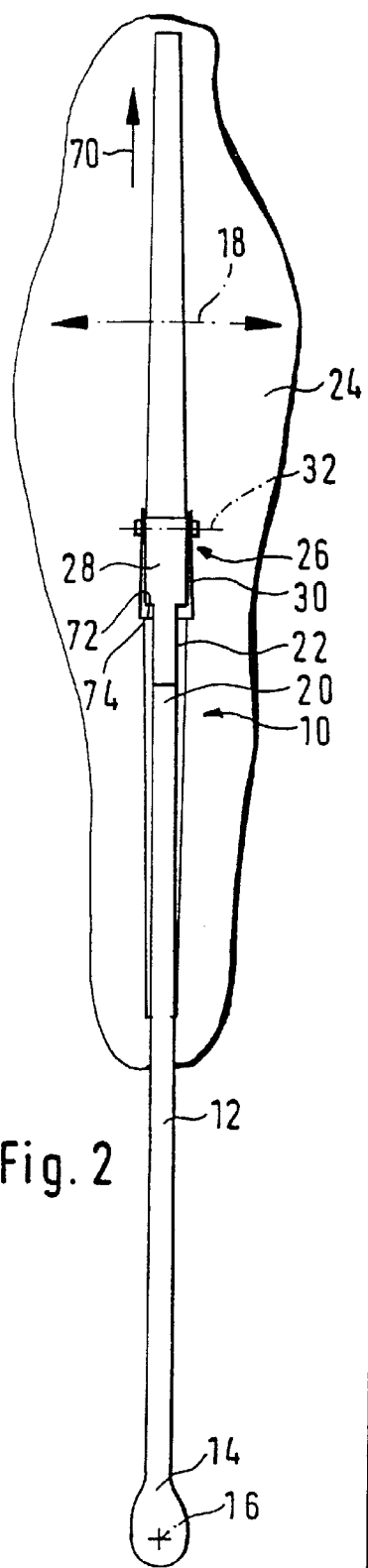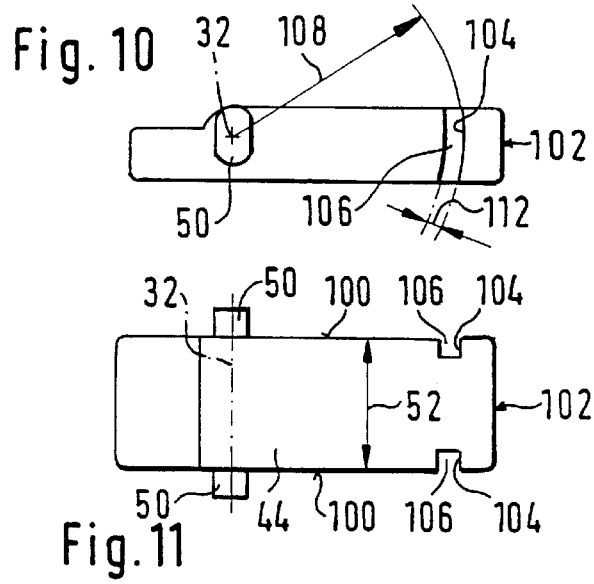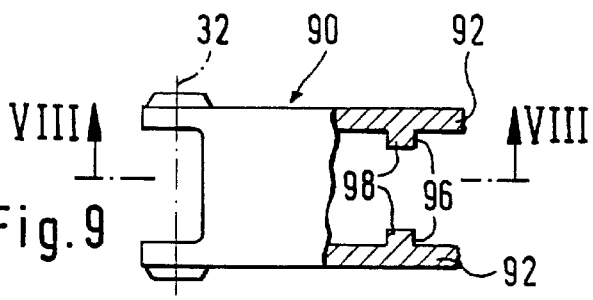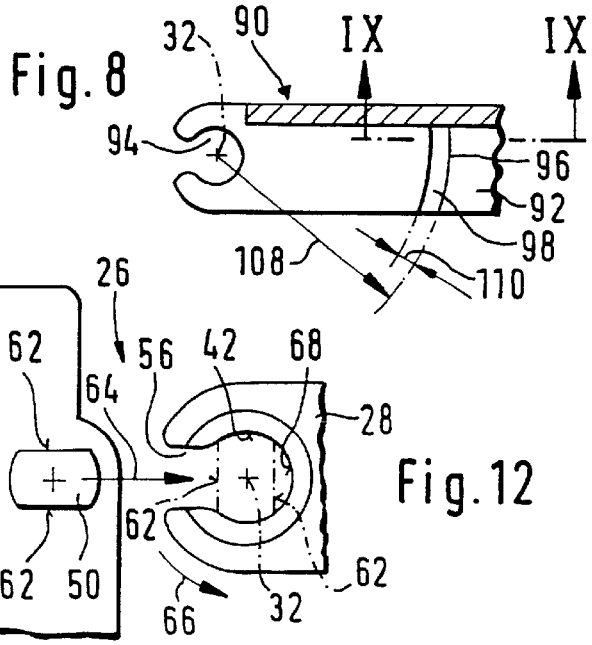

WIPING DEVICE FOR WINDOWS OF MOTOR VEHICLES HAVING A WIPER ARM WHICH IS GUIDED ON THE VEHICLE AND DRIVEN IN A PENDULUM MANNER

BACKGROUND OF THE INVENTION

The present invention deals with a wiping device of windows of motor vehicles with a wiper arm guided on the motor vehicle and oscillatingly driven in known wiping devices (German Patent Disclosure DE 32 20 274 A1), a considerable centrifugal force acts on the hinge connection between the wiper arm and the wiper blade during the oscillating working motion; particularly in so- called single-lever wiper systems—because of the comparatively large and thus heavy wiper blade—this force is further increased. This centrifugal force must be intercepted by a pin that forms the hinge axis and by a hairpin-like curvature, forming the pin bearing, of the free end of the wiper arm or a retention spring adapted to this curvature. Since furthermore the hinge connection is still exposed to environmental factors, such as road dirt, it can become deflected, because of the linear support of the pin in the curvature, which then impairs the wiping results, because in this hinge the requisite adaptation of the wiper blade to the course of the spherically curved surface of the window is done during the wiping operation.

SUMMARY OF THE INVENTION

It is therefore an object of the present invention to provide a wiping device which avoids the disadvantages of the prior art.

In keeping with these objects, one feature of present invention resides, briefly stated, in the wiping device in which at least one support shoulder is fixed to the wiper arm and pointed toward the oscillation axis, to cooperate with a check shoulder fixed on the wiper blade and pointing away from the oscillation axis.

In the wiper blade of the invention with the hinge between the wiper arm and the wiper blade is completely relieved during wiping operation, since given careful adaptation of the check shoulder to the support shoulder, no centrifugal forces can act on the hinge. Since the support is effected on generally flat shoulders, the shoulders are subject to practically no wear.

For technical production reasons, it is advantageous to dispose the support shoulder fixed to the wiper arm on the coupling part of the wiper arm, and the check shoulder of the wiper blade on the coupling part of the wiper blade, the coupling parts being part of the connection device.

A wiping device of compact structure is obtained if the support shoulder and the check shoulder are disposed between the oscillation axis and the hinge axis.

An especially simple disposition of the support shoulders and check shoulders can be accomplished if, in a feature of the invention, the coupling part of the wiper arm has a wall located in a plane vertical to the window and extending substantially in the direction of the longitudinal axis of the wiper arm, adjacent to which wall is a surface of the coupling part of the wiper blade, and if furthermore the support shoulder is embodied on this wall and the check shoulder is embodied on this surface.

In a connection device of very low design, the invention can be realized if the coupling part of the wiper arm, crosswise to the longitudinal axis of the wiper arm, has a U-shaped cross section; if furthermore one bearing receptacle each for a pivot pin of the coupling part of the wiper blade is disposed in each of the legs of the U of this coupling part, which receptacle dips between the legs of the U of the coupling part of the wiper arm, and if finally the inside of at least one leg of the U forms the wall that is provided with the support shoulder.

Expediently, the coupling part of the wiper blade has an at least imaginary base body, in which the pivot pin is integrated in such a way that its two ends protrude from it, and furthermore at least one face of the base body forms the surface that is provided with the check shoulder.

If both the support shoulder and the check shoulder have a curved course about the axis of the hinge, and the respective radius of curvature corresponds to the respective spacing from the hinge axis, then a comparatively large-area contact of the two shoulders on one another is obtained, which minimizes their wear.

Wear of the shoulders can be further minimized if, in an extension of the concept of the invention, the support shoulder is embodied on a rib-like protrusion on the inside of one leg of the U, and the check shoulder is embodied on the side wall of a groove in the surface, toward this leg of the U, of the base body.

In this way, the shoulders are located inside the connection device and are thus largely protected against dirt from the road.

In certain applications, it can be advantageous if a plurality of support shoulders and check shoulders are embodied on each of the two coupling parts.

Technical advantages in terms of production are obtained if the two coupling parts are made from a plastic.

Further advantageous refinements and features of the invention are disclosed in the ensuing description of two exemplary embodiments shown in the associated drawing.

BRIEF DESCRIPTION OF THE DRAWING

Shown in the drawing are:

FIG. 1, a wiping device of the invention in a side view;

FIG. 2, the wiping device of FIG. 1 in a plan view, rotated by 90;

FIG. 3, a side view on a larger scale of a coupling part of the wiper arm;

FIG. 4, a plan view on the coupling part of FIG. 3;

FIG. 5, the cut face of a section taken along the line V—V of FIG. 3;

FIG. 6, a side view on a larger scale of a coupling part of the wiper blade;

FIG. 7, a plan view on the coupling part of FIG. 6;

FIG. 8, a fragmentary side view of another version of the coupling part of FIG. 3, in a section taken along the line VIII—VIII of FIG. 9;

FIG. 9, a plan view on the coupling part of FIG. 8, in a section taken along the line IX—IX;

FIG. 10, a side view of another version of the coupling part of FIG. 6;

FIG. 11, a plan view of the coupling part of FIG. 10; and

FIG. 12, coupling parts of the wiper arm and wiper blade before the wiper blade is connected to the wiper arm, in an enlarged view, not to scale.

DESCRIPTION OF THE PREFERRED EMBODIMENTS

A wiping device 10 shown in FIGS. 1 and 2 has a wiper arm 12, one end 14 of which is supported, so as to be capable of oscillation about an oscillation axis 16, on a vehicle body, not shown. An elongated wiper blade 22 is pivotably connected to the end 20 of the wiper arm 12 remote from the oscillation axis 16, and its length extends transversely to the oscillation direction (double arrow 18). The wiper blade 22 is placed in the direction of the arrow 25 against the surface to be wiped of a windshield 24 belonging to the motor vehicle. The connection between the wiper arm 12 and the wiper blade 22 is made via a connection device 26, which includes a coupling part 28 of the wiper arm and a coupling part 30 of the wiper blade. The coupling part 28 is solidly connected to the wiper arm 12, and the coupling part 30 is solidly connected to the wiper blade 22. The hinge connection between the wiper blade 22 and the wiper arm 12 is made such that the axis 32 of the hinge extends substantially in the oscillation direction (double arrow 18), or in other words, transversely to the length of the wiper blade 22. The design of the hinge means in a first embodiment according to FIGS. 1 and 2 will be described in further detail below in conjunction with FIGS. 3–7.

The coupling part 28 of the wiper arm, shown in FIGS. 3 and 4, has a retaining arm 34, which serves the purpose of solidly connecting the coupling part 28 to the wiper arm 12. The retaining arm 34 is adjoined by a hinge piece 36 of U-shaped cross section. One bearing receptacle 42 is disposed in each of the two legs 38 and 40 of the U. The other coupling part 30, belonging to the wiper blade, is shown in FIGS. 6 and 7. It has a substantially block-shaped base body 44, with two parallel side surfaces 46 and 48, from which the two ends 50 of a pivot pin, which is conceptually integrated with the base body 44, protrude. The longitudinal axis of this pivot pin—or the two aligned longitudinal axes of the pins 50—correspond to the axis 32 of the hinge in FIG. 2. The spacing 52 of the two side surfaces 46 and 48 of the base body 44 from one another is adapted to the spacing 54 (FIG. 5) between the legs 38, 40 of the U of the coupling part 28 in such a way that the base body 44 can dip with as little play as possible yet smoothly between the legs 38 and 40 of the U. This is the case whenever the wiper blade 22 is pivotably connected to the wiper arm 12. It is in fact then that the two pin ends 50 are located in their bearing receptacles 42 of the coupling part 28 of the wiper arm. Since the bearing receptacles 42 in the two legs 38 and 40 of the U are aligned with one another, the joint bearing axis of the two bearing receptacles 42 is also equivalent to the axis 32 of the hinge.

To allow the two coupling parts 28 and 30 made from a plastic, or in other words the wiper arm 12 and the wiper blade 22, to be joined together pivotably but in captive fashion, the bore-like bearing receptacles 42 in each of the legs 38 and 40 of the U of the coupling part 28 are open at the edge via a slit-like opening 56. These opening slits are located substantially parallel to the surface of the window 24 to be wiped and point outward away from the oscillation axis 16. The width 58 of the openings 56 is adapted to a spacing 60 between the flat faces 62, toward the window 24, of the pin ends 50 in such a way that the pin ends 50 can be introduced, via the two openings 56 respectively associated with them, into their bearing receptacles 42, once the flat faces 62 have been oriented lengthwise of the openings. This arrangement, which also shows the mounting position, is shown enlarged in FIG. 12. The work steps for connecting the wiper blade 22 to the wiper arm 12 will be described in further detail in conjunction with FIG. 12. There, the two coupling parts 28 and 30 are represented by solid lines. For connecting the wiper blade 22 to the wiper arm 12, the wiper blade is put in a position in which the flat faces 62 of the pin ends 50 are located in the extension of the openings 56 (FIG. 12). After that, the two pin ends 50 are introduced into their bearing receptacles 42, in which the wiper blade is moved in the direction of the arrow 64 relative to the coupling part 28 of the wiper arm. Once the two pin ends 50 are located entirely in their bearing receptacles 42, the wiper blade 22 is rotated in the direction of the arrow 66, until the flat faces 62 reach the position shown in dot-dash lines in FIG. 12, in which they are aimed at the window 24. FIG. 12 shows that the flat faces 62 are located inside an imaginary jacket face 68, which in FIG. 12 is represented by the wall of the bearing receptacles 42. It can be seen that in this operating position of the connection device 26, shown in dot-dash lines, it is no longer possible to remove the wiper blade 22 from the wiper arm 12. Since during wiping operation the wiper blade rests on the window 24 to be wiped, the wiper blade can also not be unintentionally pivoted counter to the directional arrow 66 to make it possible to release the connection. The result is thus a reliable plug-in and turn connection, which can also be released again in a simple way by pivoting the wiper blade 22, raised from the window counter to the directional arrow 25, approximately 90 counter to the direction of the arrow 66. After that, it is possible to pass the pin ends 50 out through the openings 56 of the bearing receptacles 42.

To prevent the centrifugal force (arrow 70, FIG. 2) originating in the wiper blade 22 from being able to act on the hinge 32, 42, 50 during wiping operation, the wiping device has a support shoulder fixed to the wiper arm and pointing toward the oscillation axis 16; associated with it is a check shoulder fixed to the wiper blade and pointing away from the oscillation axis 16.

In the exemplary embodiment of FIGS. 3 through 7, one support shoulder 72 is formed on each of the exposed end edges of the legs 38 and 40 of the U of the hinge piece 36. The check shoulders 74 of the wiper blade are located on lateral protrusions 76 of the base body 44, which protrude from the side surfaces 46 and 48. Both the support shoulders 72 and the two check shoulders 74 have a course that is curved around the axis 32 of the hinge; the respective radius of curvature 78 corresponds to the respective spacing from the hinge axis 32. The radii of curvature 78 are adapted to one another such that when the wiping device is in the operating position (FIG. 1), the support shoulders 72 with the hinge 42, 50 relieved rest on the check shoulders 74, so that in this operating position the hinge between the wiper arm and the wiper blade remains without play and operates smoothly. If then during wiping operation centrifugal forces (arrow 70 in FIG. 2) seek to act on the hinge 32, 42, 50, they are intercepted by the support shoulders 72 and the check shoulders 74 associated with them in such a way that the hinge 32 is unaffected by them.

Since during wiping operation the wiper blade in its length has to follow the course of the spherically curved windshield yet the wiper arm oscillates about its oscillation axis 16, the result is a constant oscillating motion (arrow 80 in FIG. 1) of the wiper blade 22 relative to the wiper arm 12 about the axis 32 of the hinge. To assure cooperation of the support shoulder 72 with the check shoulder 74 even at the reversal points of the oscillation, the protrusions 76 protrude with the check shoulder 74 outward past the block-shaped base body 44 of the coupling part 30 of the wiper blade by a distance 82 (FIG. 6).

A second embodiment of the invention will now be described in conjunction with FIGS. 8 through 11. The coupling part 90 of the wiper arm is substantially equivalent to the coupling part 28 of the wiper arm already described. Once again, it has a U-shaped construction, with legs 92 of the U in which bearing receptacles 94 that correspond to the bearing receptacles 42 in the coupling part 28 are disposed. In a departure from the exemplary embodiment already described, the support shoulders 96 in this embodiment of the invention are embodied on rib-like protrusions 98, which are present on the insides, facing one another, of the legs 92 of the U. In the side surfaces 100, facing away from one another, of the coupling part 102 of the wiper blade, which again has a base body 44—the construction of this coupling part is substantially equivalent to that of the coupling part 30 of the wiper blade—the check shoulders 104 pointing away from the oscillation axis 16 are embodied on the side walls at grooves 106, which are disposed in the side faces 100 of the coupling part 102 of the wiper blade. In this embodiment as well, both the support shoulders 96 and the check shoulders 104 have a course curved about the axis 32 of the hinge, and the radii 108 of the support shoulders 96 and check shoulders 104 correspond to one another. The width 110 of the rib-like protrusions 98 also corresponds to the widths 12 of the grooves 106. Thus a cooperation of the support shoulders and check shoulders is obtained during operation of the wiping device 10, of the kind already described in conjunction with the first exemplary embodiment of the invention.

If one looks at FIGS. 3–7 and 8–10, taking the above descriptions into account, along with FIG. 2, it can be seen that the respective support shoulders 72 and 96 and the check shoulders 74 and 104 associated with them are disposed, in the installed wiping device 10, between the oscillation axis 16 and the axis 32 of the hinge 42, 50. It is also then clear that the coupling parts 28 and 90 of the wiper arm are located in planes that are vertical to the window 24 and have walls 38, 40 and 92 extending substantially in the direction of the longitudinal axis of the wiper arm, and a respective surface 46, 48 and 100 of the coupling part 44 and 102 of the wiper blade is adjacent to each wall, and the support shoulder is formed on the walls while the check shoulder is formed on the surfaces.

In the operating position of the wiping device, in this embodiment as well, support shoulders 96 of the coupling part 90 of the wiper arm rest on the check shoulders 104 of the coupling part 102 of the wiper blade, so that the pin ends 50 are relieved of the centrifugal forces (arrow 70) caused by the wiper blade 22.

A common feature of both exemplary embodiments is that the wiping device 10 has at least one support shoulder 72 and 96 fixed to the wiper arm and pointing toward the oscillation axis 16, with which a check shoulder 74 and 104 fixed to the wiper blade and pointing away from the oscillation axis 16 is associated.

What is claimed is:

1. A wiping device for windows of motor vehicles, having an oscillatingly driven wiper arm (12), guided on the motor vehicle, on whose free end, remote from an oscillation axis (16), a wiper blade (22) which is elongated transversely to the oscillation direction (18), that can be placed against the window (24) is releasably hinged via a connection device (26) that has coupling parts on the wiper arm and on the wiper blade, and the hinge axis (32) extends substantially in the oscillation direction, the wiping device (10) has at least one support shoulder (72 and 96) fixed to the wiper arm and facing toward the oscillation axis (16) to cooperate with a check shoulder (74 and 104) fixed to the wiper blade and facing away from the oscillation axis (16), both the support shoulder (72 and 96) and the check shoulder (74 and 104) have a curved course about the axis (32) of the hinge, and a respective radius of curvature (78) of said course corresponds to the respective spacing from the hinge axis (32).

2. A wiper blade of a wiping device for windows of motor vehicles having a driven wiper arm (12) which is guided on a motor vehicle and has a free end remote from an oscillation axis (16), the wiper blade including a wiper blade element (22) releasably hingable on the free end of the wiper arm (12); and a connection device (26) provided for releasably hinging the wiper blade element (22) on the free end of the wiper arm (12), the connection device (26) having a coupling part (30) provided with a base body (44), a hinge axle (32) and check shoulders (74), the hinge axle (32) being arranged on the base body (44) and having two ends extending outwardly beyond the base body (44), the check shoulders (74) being arranged on the base body (44) so that when the wiper blade is assembled they face away from the oscillation axis (10) of the wiper arm (12), the hinge axle (32) being formed as a pin with two ends (50) extending on both sides of the coupling part (30) and receivable in a bearing receptacle (42) of the wiper arm (12) on the both sides, the check shoulder (74) being formed on side walls of grooves (106) disposed on side faces (100) of the base body (44).

3. A wiper arm for a wiping device for windows of motor vehicles having a wiper blade (22) placeable against a window (24), the wiper arm comprising a wiper arm element (12) having a free end remote from an oscillation axis (16); and a connection devices (26) for releasably hinging the wiper blade (22) on the wiper arm element (12), the connection device (26) having a coupling part (28) provided with a hinge piece (36), at least one bearing receptacle (42), and support shoulders (72) formed as rib-shaped protrusions (98) disposed facing toward one another on insides of legs of the coupling part (90), the at least one bearing receptacle (42) being arranged on the hinge piece (36) so that it can receive ends of a hinge axle (32) extending from the wiper blade (22), the support shoulders (72) being arranged on the hinge piece (36) so that they face the oscillation axis (16) of the wiper arm element (12).

4. A wiping device for windows of motor vehicles, having an oscillatingly driven wiper arm (12), guided on the motor vehicle, on whose free end, remote from an oscillation axis (16), a wiper blade (22) which is elongated transversely to the oscillation direction (18), that can be placed against the window (24) is releasably hinged via a connection device (26) that has coupling parts on the wiper arm and on the wiper blade, and the hinge axis (32) extends substantially in the oscillation direction, the wiping device (10) has at least one support shoulder (72 and 96), fixed to the wiper arm and facing toward the oscillation axis (16) to cooperate with a check shoulder (74 and 104) fixed to the wiper blade and facing away from the oscillation axis (16); and the hinge axis (32) is arranged on the coupling part (30) of the wiper blade and has a base body (44), and the hinge axis (32) is formed as a pivot pin with two ends (50) extending from the base body (44), wherein the support shoulder (72 and 96) fixed to the wiper arm is disposed on the coupling part (28 and 90) of the wiper arm, and the check shoulder (74 and 104) of the wiper blade is disclosed on the coupling part (30 and 102) of the wiper blade, the coupling parts being part of the connection device (26), wherein the coupling part (28 and 90) of the wiper arm has a wall (38, 40 and 92) located in a plane vertical to the window (24) and extending substantially in the direction of the longitudinal axis of the wiper arm, adjacent to which wall is a surface (46, 48 and 100)of the coupling part (44 and 102) of the wiper blade, and that the support shoulder (72 and 96) is embodied on this wall and the check shoulder (74 and 104) is embodied on this surface; at least one phase (46, 48) of the base body (44)

forms the surface that is provided with the check shoulder (74), wherein the support shoulder (96) is embodied on a rib-shaped protrusion (98) on an inside of one leg (92) of a U, and the check shoulder (104) is embodied on the side wall of a groove (106) in the surface, toward the one leg (92), of the U, of the base body (44).

5. A wiping device for windows of motor vehicles, having an oscillatingly driven wiper arm (12), guided on the motor vehicle, on whose free end, remote from an oscillation axis (16), a wiper blade (22) which is elongated transversely to the oscillation direction (18), that can be placed against the window (24) is releasably hinged via a connection device (26) that has coupling parts on the wiper arm and on the wiper blade, and the hinge axis (32) extends substantially in the oscillation direction, the wiping device (10) has at least one support shoulder (72 and 96), fixed to the wiper arm and facing toward the oscillation axis (16) to cooperate with a check shoulder (74 and 104) fixed to the wiper blade and facing away from the oscillation axis (16); and the hinge axis (32) is arranged on the coupling part (30) of the wiper blade and has a base body (44), and the hinge axis (32) is formed as a pivot pin with two ends (50) extending from the base body (44), wherein the support shoulder (72 and 96) fixed to the wiper arm is disposed on the coupling part (28 and 90) of the wiper arm, and the check shoulder (74 and 104) of the wiper blade is disposed on the coupling part (30 and 102) of the wiper blade, the coupling parts being part of the connection device (26), wherein the coupling part (28 and 90) of the wiper arm has a wall (38, 40 and 92) located in a plane vertical to the window (24) and extending substantially in the direction of the longitudinal axis of the wiper arm, adjacent to which wall is a surface (46, 48 and 100)of the coupling part (44 and 102) of the wiper blade, and that the support shoulder (72 and 96) is embodied on this wall and the check shoulder (74 and 104) is embodied on this surface; at least one phase (46, 48) of the base body (44) forms the surface that is provided with the check shoulder (74), both the support shoulder (72 and 96) and the check shoulder (74 and 104) have a curved course about the axis (32) of the hinge, and the respective radius of curvature (78) corresponds to the respective spacing from the hinge axis (32), wherein the support shoulder (96) is embodied on a rib-shaped protrusion (98) on an inside of one leg (92) of a U, and the check shoulder (104) is embodied on the side wall of a groove (106) in the surface, toward the one leg (92), of the U, of the base body (44).

6. A wiping device for windows of motor vehicles, having an oscillatingly driven wiper arm (12), guided on the motor vehicle, on whose free end, remote from an oscillation axis (16), a wiper blade (22) which is elongated transversely to the oscillation direction (18), that can be placed against the window (24) is releasably hinged via a connection device (26) that has coupling parts on the wiper arm and on the wiper blade, and the hinge axis (32) extends substantially in the oscillation direction, the wiping device (10) has at least one support shoulder (72 and 96), fixed to the wiper arm and facing toward the oscillation axis (16) to cooperate with a check shoulder (74 and 104) fixed to the wiper blade and facing away from the oscillation axis (16), wherein both the support shoulder (72 and 96) and the check shoulder (74 and 104) have a curved course about the axis (32) of the hinge, and the respective radius of curvature (78) corresponds to the respective spacing from the hinge axis (32), and wherein the support shoulder (96) is embodied on a rib-shaped protrusion (98) on an inside of one leg (92) of a U, and the check shoulder (104) is embodied on the side wall of a groove (106) in the surface, toward the one leg (92) of the U, of a base body (44).

* * * * *